US012703765B2

(12) United States Patent
Tartarin et al.

(10) Patent No.: US 12,703,765 B2
(45) Date of Patent: Aug. 11, 2026

(54) AQUEOUS ORGANIC PEROXIDE EMULSION

(71) Applicant: ARKEMA FRANCE, Colombes (FR)

(72) Inventors: Isabelle Tartarin, Pierre-Benite Cedex (FR); Juergen Lohr, Günzburg (DE)

(73) Assignee: ARKEMA FRANCE, Colombes (FR)

( * ) Notice: Subject to any disclaimer, the term of this patent is extended or adjusted under 35 U.S.C. 154(b) by 1037 days.

(21) Appl. No.: 17/615,858

(22) PCT Filed: Jul. 17, 2020

(86) PCT No.: PCT/FR2020/051297
§ 371 (c)(1),
(2) Date: Jul. 15, 2022

(87) PCT Pub. No.: WO2021/014083
PCT Pub. Date: Jan. 28, 2021

(65) Prior Publication Data

US 2023/0141531 A1 May 11, 2023

(30) Foreign Application Priority Data

Jul. 22, 2019 (FR) ...................................... 1908298

(51) Int. Cl.

| | |
|---|---|
| ***C08F 4/34*** | (2006.01) |
| ***C08F 2/30*** | (2006.01) |
| ***C08F 14/06*** | (2006.01) |
| ***C08K 5/14*** | (2006.01) |

(52) U.S. Cl.
CPC ................ *C08F 2/30* (2013.01); *C08F 14/06* (2013.01); *C08K 5/14* (2013.01); *C08F 4/34* (2013.01)

(58) Field of Classification Search
None
See application file for complete search history.

(56) References Cited

U.S. PATENT DOCUMENTS

| | | | | |
|---|---|---|---|---|
| 4,039,475 | A | 8/1977 | Oosterwijk et al. | |
| 4,415,716 | A | 11/1983 | Lundin et al. | |
| 9,410,002 | B2 * | 8/2016 | Tartarin | C08F 4/32 |
| 2015/0232590 | A1 * | 8/2015 | Tartarin | C08F 14/06 526/203 |
| 2017/0226318 | A1 | 8/2017 | Tartarin et al. | |

FOREIGN PATENT DOCUMENTS

| | | | | |
|---|---|---|---|---|
| FR | 3002236 | A1 | 8/2014 | |
| FR | 3027236 | A1 | 4/2016 | |
| JP | 57167733 | A * | 10/1982 | |
| JP | S57167733 | A | 10/1982 | |
| JP | H09143214 | A | 6/1997 | |
| JP | H11171914 | A | 6/1999 | |
| JP | 2001064312 | A | 3/2001 | |
| WO | 9905101 | A1 | 2/1999 | |
| WO | WO-9931194 | A1 * | 6/1999 | C09K 3/00 |
| WO | 03095500 | A1 | 11/2003 | |
| WO | 2011015567 | A2 | 2/2011 | |

OTHER PUBLICATIONS

ISA/EP; International Search Report and Written Opinion for International Patent Application No. PCT/FR2020/051297 dated Nov. 19, 2020, 14 pages.

* cited by examiner

*Primary Examiner* — Richard A. Huhn
(74) *Attorney, Agent, or Firm* — Rimon P.C.; Allyn B. Elliott

(57) ABSTRACT

The present invention relates to an aqueous emulsion of peroxyester, comprising at least one peroxyester, at least one antifreeze and a combination of at least two emulsifiers chosen from the group consisting of a non-ethoxylated sorbitan ester, an ethoxylated sorbitan ester and an ethoxylated fatty alcohol.

20 Claims, No Drawings

AQUEOUS ORGANIC PEROXIDE EMULSION

CROSS-REFERENCE TO RELATED APPLICATIONS

This application is a U.S. National Stage application of International Patent Application No. PCT/FR2020/051297, filed on Jul. 17, 2020, which claims the benefit of French Patent Application No. 1908298, filed on Jul. 22, 2019.

FIELD OF THE INVENTION

The invention relates to an aqueous emulsion of peroxyester, which may be used for the polymerization or copolymerization of ethylenically unsaturated monomers and in particular of vinyl chloride.

The precautions inherent to the instability of organic peroxides form an integral part of the knowledge well known to those skilled in the art. It is moreover on account of their unstable properties that organic peroxides are used, inter alia, as initiators for the polymerization of vinyl monomers.

The most reactive organic peroxides are commonly conditioned in the form of an aqueous emulsion in the presence of antifreezes. This conditioning makes it possible both to absorb and to dissipate the energy generated in the event of possible decomposition of the peroxides and to maintain the emulsion in liquid form, at temperatures below −10° C., generally below −20° C. This conditioning thus limits any unintended decomposition of the peroxides.

Emulsions of organic peroxides generally comprise, in addition to water and antifreeze, an emulsifier for lowering the interface tension between the aqueous phase and the organic peroxide to facilitate its dispersion in the form of droplets and to stabilize these droplets over time (maintenance of the droplet size).

The stability of organic peroxide emulsions is essential in terms of safety (during production, transportation and storage) but also for use during polymerization.

This is because the use of a non-homogeneous organic peroxide emulsion as polymerization initiator in an emulsion or suspension of vinyl monomer may produce inhomogeneity in the final product. This inhomogeneity is generally characterized by polymer particles that are poorly gelled during implementation in molten form ("fish eyes", hard grains). Now, the presence of hard grains opacifies the polymer material. These stability considerations are thus very important for applications in which the transparency of the final product is imperative, notably for medical applications.

It is thus imperative to conserve good stability of the organic peroxide emulsions up to their time of use.

However, the emulsion becomes destabilized over time and the mean size of the peroxide droplets increases. The increase in the droplet size may give rise to phase separation. A peroxide emulsion is generally considered to be satisfactory if the mean droplet size does not exceed 5 μm, the maximum droplet size does not exceed 20 μm and the droplet size distribution is homogeneous.

Moreover, the steps of discharging organic peroxide emulsions in intermediate storage silos, of pumping and of introduction into a polymerization reactor are steps that are important for the quality of the polymer obtained and the reliability of the polymerization process. These steps must be performed as rapidly as possible. To do this, it is crucial for the organic peroxide emulsions to have a low viscosity so that the flow of the emulsion is facilitated as much as possible. Thus, an organic peroxide emulsion must have a maximum dynamic viscosity of 1000 mPa·s (milliPascal-seconds) at −10° C. for a shear rate of 100 $s^{-1}$ (the dynamic viscosity measurements are taken using coaxial cylinders which create the shear, for example according to the standard DIN 53019).

Now, a person skilled in the art knows that, for this type of emulsion, seeking to reduce the droplet size contributes toward increasing the viscosity. (See paragraph 1.4 of the article by J. P. Canselier and M. Poux, "Procédés d'émulsification—Mécanisme de formation des émulsions [Emulsification processes—emulsion formation mechanism]" Techniques de l'Ingénieur J2 152, pages 1-12, publication of 10 Jun. 2004).

Thus, achieving these two main objectives simultaneously is a substantial difficulty for a person skilled in the art on account of the conflicting choices that he is made to envisage.

PRIOR ART

WO 99/05101 discloses the use of partially hydrolyzed polyvinyl acetate (PVA) as a colloid agent in combination with nonionic surfactants with an HLB (hydrophilic-lipophilic balance) value of greater than 16, for aqueous emulsions of peroxyesters. A peroxide emulsion requires a low viscosity. Thus, said document states that a surfactant with an HLB of less than 16 can increase the final viscosity of the emulsion.

Similarly, WO 03/095500 discloses the use of partially hydrolyzed PVA in combination with nonionic surfactants with an HLB value of greater than 15, for aqueous emulsions of peroxydicarbonates or diacyl peroxides. Said document also states that the addition of surfactants, with an HLB of less than 10, has a harmful effect and increases the final viscosity of the organic peroxide emulsion.

BRIEF DESCRIPTION OF THE INVENTION

The Applicant has discovered that the use of a combination of two particular emulsifiers surprisingly stabilizes an aqueous emulsion of organic peroxide while at the same time having a viscosity which allows good implementation of the emulsion.

The present invention thus relates to an aqueous emulsion of peroxyester, comprising:

- at least one peroxyester,
- at least one antifreeze,
- a combination of at least two emulsifiers chosen from the group consisting of:
  - a non-ethoxylated sorbitan ester,
  - an ethoxylated sorbitan ester,
  - an ethoxylated fatty alcohol.

The invention thus allows the production of an emulsion comprising a mean droplet size ($d_{50}$) of less than 5 μm after production or during storage at −20° C. for several months. The emulsion according to the invention is compatible with the polymerization of ethylenically unsaturated derivatives and in particular of vinyl monomers such as the vinyl chloride monomer, since it has a very low viscosity permitting a very short flow time.

The invention also relates to a process for preparing an aqueous emulsion of peroxyester, comprising a step a) of mixing:

- at least one antifreeze,

- a combination of at least two emulsifiers chosen from the group consisting of 1) a non-ethoxylated sorbitan ester, 2) an ethoxylated sorbitan ester, and 3) an ethoxylated fatty alcohol,
- water,
- at least one peroxyester.

The present invention also relates to the use of the emulsion as defined above for the polymerization of ethylenically unsaturated monomers.

Other features and advantages of the invention will emerge more clearly on reading the description and the examples that follow.

In the following text, and unless indicated otherwise, the limits of a range of values are included in this document.

The expression "at least one" is equivalent to the expression "one or more".

DETAILED DESCRIPTION OF THE INVENTION

Emulsion

Preferably, said at least one peroxyester is present in a content of between 30% to 70% by weight, preferably from 35% to 65% by weight and more preferentially from 40% to 60% by weight relative to the total weight of the composition.

Preferably, the peroxyester is chosen from the group consisting of:

- peroxyneodecanoates, such as α-cumyl peroxyneodecanoate, 2,4,4-trimethylpentyl 2-peroxyneodecanoate, 3-hydroxy-1,1-tert-butyl peroxyneodecanoate, tert-butyl peroxyneodecanoate, tert-amyl peroxyneodecanoate, dimethylbutyl peroxyneodecanoate and 3-hydroxy-1,1-dimethylbutyl peroxyneodecanoate,
- peroxyneoheptanoates, such as 3-hydroxy-1,1-dimethylbutyl peroxyneoheptanoate, α-cumyl peroxyneoheptanoate and tert-butyl peroxyneoheptanoate,
- peroxypivalates such as tert-amyl peroxypivalate and tert-butyl peroxypivalate,
- peroxyethylhexanoates such as tert-amyl 2-peroxyethylhexanoate, tert-butyl 2-peroxyethylhexanoate, 1,1,3,3-tetramethylbutyl 2-peroxyethylhexanoate, 3-hydroxy-1,1-dimethylbutyl 2-peroxyethylhexanoate,
- tert-butyl peroxyisobutyrate,
- and mixtures thereof.

Particularly preferably, the peroxyester is a peroxypivalate, in particular tert-butyl peroxypivalate or tert-amyl peroxypivalate, and more preferentially is tert-butyl peroxypivalate.

The tert-butyl peroxypivalate may be, for example, Luperox® 11 from Arkema.

The tert-amyl peroxypivalate may be, for example, Luperox® 554 from Arkema.

Alternatively, particularly preferably, the peroxyester is a peroxyneodecanoate, chosen in particular from the group consisting of: tert-butyl peroxyneodecanoate, tert-amyl peroxyneodecanoate, α-cumyl peroxyneodecanoate and 3-hydroxy-1,1-dimethylbutyl peroxyneodecanoate, and more preferentially is 3-hydroxy-1,1-dimethylbutyl peroxyneodecanoate.

Particularly preferably, the peroxyester is chosen from the group consisting of tert-butyl peroxypivalate, tert-amyl peroxypivalate, tert-butyl peroxyneodecanoate, 3-hydroxy-1,1-dimethylbutyl peroxyneodecanoate, tert-amyl peroxyneodecanoate and α-cumyl peroxydecanoate.

The 3-hydroxy-1,1-dimethylbutyl peroxyneodecanoate may be, for example, Luperox® 610 from Arkema.

The α-cumyl peroxydecanoate may be, for example, Luperox® 188 from Arkema.

The tert-amyl peroxyneodecanoate may be, for example, Luperox® 546 from Arkema.

The tert-butyl peroxyneodecanoate may be, for example, Luperox® 10 from Arkema.

Preferably, the peroxyester is liquid at room temperature.

In order to be able to be stored at temperatures below −10° C., preferentially below −20° C., the composition according to the invention comprises at least one antifreeze.

Preferably, said at least one antifreeze is an alcohol, preferably chosen from the group consisting of ethanol, ethylene glycol, isopropanol, n-propanol, 1,2-propanediol, 1,2-propanediol, 1,3-propanediol, glycerol, 1-butanol, 2-butanol, 1,3-butanediol and 1,4-butanediol and mixtures thereof, preferably chosen from the group consisting of isopropanol, ethanol, propanediol and mixtures thereof.

Particularly preferably, said at least one antifreeze is ethanol, optionally in combination with another alcohol, preferably chosen from the group consisting of ethylene glycol, isopropanol, n-propanol, 1,2-propanediol, 1,2-propanediol, 1,3-propanediol, glycerol, 1-butanol, 2-butanol, 1,3-butanediol, 1,4-butanediol and a mixture thereof.

Advantageously, said at least one antifreeze comprises a mixture of ethanol and of propanediol, and in particular consists of a mixture of ethanol and propanediol. Preferably, the propanediol is a 1,2-propanediol.

Preferably, the aqueous emulsion according to the invention comprises between 5% and 25% by weight of antifreeze, preferably between 10% and 20% by weight of antifreeze, relative to the total weight of the aqueous emulsion.

Preferably, the aqueous emulsion according to the invention comprises between 0 and 10% by weight of methanol, preferably between 0 and 5% by weight of methanol, preferably between 0 and 4% by weight of methanol, preferably between 0 and 3% by weight of methanol, preferably between 0 and 2% by weight of methanol, more preferentially between 0 and 1% by weight of methanol relative to the total weight of the emulsion, and particularly preferably does not comprise any methanol.

For the purposes of the present invention, the term "emulsifier" means a compound which has an influence on the interfacial surface tension between the aqueous phase and the organic phase comprising the organic peroxide.

For the purposes of the present invention, the expression "a combination of at least two emulsifiers chosen from the group consisting of: a non-ethoxylated sorbitan ester, an ethoxylated sorbitan ester and an ethoxylated fatty alcohol" means that the combination must comprise:

- at least one non-ethoxylated sorbitan ester and one ethoxylated sorbitan ester,
- at least one non-ethoxylated sorbitan ester and one ethoxylated fatty alcohol, or
- at least one ethoxylated sorbitan ester and one ethoxylated fatty alcohol.

Preferably, the combination comprises:

- at least one non-ethoxylated sorbitan ester and one ethoxylated sorbitan ester,
- or
- at least one non-ethoxylated sorbitan ester and one ethoxylated fatty alcohol.

In one particular embodiment, the combination may comprise at least one non-ethoxylated sorbitan ester, one ethoxylated sorbitan ester and one ethoxylated fatty alcohol.

Preferably, the combination of said at least two emulsifiers has an HLB of less than 13, preferably less than or equal to 12, preferably less than or equal to 11, more preferably less than or equal to 10.

Preferably, the combination of said at least two emulsifiers has an HLB of greater than 5, preferably greater than or equal to 6, more preferably greater than or equal to 7.

Preferably, the combination of said at least two emulsifiers has an HLB of between 5 and 13, preferably between 6 and 12, more preferentially between 7 and 11.

The term "HLB" or "HLB value" means the hydrophilic-lipophilic balance which enables assessment of the solubility of an emulsifier in water. Preferably, the HLB is determined according to the method proposed by Griffin (Journal of the Society of Cosmetic Chemists, 5(4), (1954), 249-256).

The HLB of the combination of said at least two emulsifiers may be calculated from the mass ratio of the emulsifiers.

Preferably, the emulsifier according to the invention does not comprise any partially hydrolyzed polyvinyl acetate, more preferentially does not comprise any polyvinyl acetate, more preferentially does not comprise any polyvinyl acetate or any cellulose ester. This notably enables a reduction in the industrial preparation time, since polyvinyl acetate which is in solid form requires a preliminary dissolution step, and enables the risks associated with the handling of powders to be minimized.

Preferably, the ethoxylated fatty alcohol is a $C_4$-$C_{30}$, preferably $C_4$-$C_{20}$, more preferably $C_{16}$-$C_{18}$ linear or branched, cyclic or noncyclic, saturated or unsaturated, aromatic or nonaromatic fatty alcohol.

Preferably, the ethoxylated fatty alcohol is chosen from the group consisting of ethoxylated octyldodecanol, ethoxylated decanol, ethoxylated lauryl alcohol, ethoxylated oleocetyl alcohol, ethoxylated isodecanol, ethoxylated capryl alcohol, the alcohol ethoxylated isotridecanol, ethoxylated cetostearyl alcohol, ethoxylated caprylyl alcohol, ethoxylated myristyl alcohol, ethoxylated hexadecanoyl or palmityl alcohol, ethoxylated stearyl alcohol, ethoxylated eicosanoyl or arachidyl alcohol, ethoxylated behenyl alcohol, ethoxylated oleyl alcohol, ethoxylated eicosenoyl or gadolinyl alcohol, ethoxylated docosenoyl alcohol, ethoxylated ricinoleyl alcohol, ethoxylated linoleyl alcohol and ethoxylated linolenyl alcohol, and mixtures thereof.

Preferably, the fatty alcohol comprises between 3 and 80 ethylene oxide groups, preferably between 20 and 40, preferentially between 22 and 30 and more preferentially 25 ethylene oxide groups.

Particularly preferably, the fatty alcohol is a $C_4$-$C_{30}$, preferably $C_4$-$C_{20}$, preferably $C_{16}$-$C_{18}$ linear or branched, cyclic or noncyclic, saturated or unsaturated, aromatic or nonaromatic fatty alcohol and contains between 3 and 80 alkylene oxide units, preferably between 20 and 40, preferentially between 22 and 30 and more preferentially 25 alkylene oxide groups. Advantageously, the fatty alcohol is a $C_{16}$-$C_{18}$ alcohol comprising 23 to 25 ethylene oxide groups. The fatty alcohol may advantageously be a $C_{18}$ alcohol comprising 23 ethylene oxide groups, such as Surfaline® OC23L from Arkema. The fatty alcohol may advantageously be a $C_{18}$ alcohol comprising 25 ethylene oxide groups, such as Surfaline® CS25L from Arkema.

Preferably, the non-ethoxylated sorbitan ester is chosen from the group consisting of sorbitan monostearate, sorbitan tristearate, sorbitan monolaurate, sorbitan trilaurate, sorbitan monooleate, sorbitan trioleate, sorbitan monopalmitate and sorbitan tripalmitate and combinations thereof.

Sorbitan monooleate is available under the brand name Span 80® (from Croda).

Preferably, the ethoxylated sorbitan ester comprises between 3 and 40 ethylene oxide groups, preferably between 5 and 20 ethylene oxide groups.

Preferably, the ethoxylated sorbitan ester is chosen from the group consisting of ethoxylated sorbitan monostearate, ethoxylated sorbitan tristearate, ethoxylated sorbitan monolaurate, ethoxylated sorbitan trilaurate, ethoxylated sorbitan monooleate, ethoxylated sorbitan trioleate, ethoxylated sorbitan monopalmitate, ethoxylated sorbitan tripalmitate and combinations thereof.

Sorbitan monooleate 20 OE is available under the brand name Surfaline SE80® (from Arkema) or Tween 80® (from Croda).

Preferably, the combination of the at least two emulsifiers comprises a non-ethoxylated sorbitan as defined above and an ethoxylated sorbitan comprising between 5 and 20 ethylene oxide groups.

Preferably, the combination of the at least two emulsifiers comprises a non-ethoxylated sorbitan as defined above and a $C_{16}$-$C_{22}$ ethoxylated alcohol comprising between 22 and 30 ethylene oxide groups.

Preferably, said at least two emulsifiers are present in a content ranging from 0.05% to 5% by weight of the emulsion, preferably ranging from 1% to 2% by weight. The expression "the two emulsifiers are present in a content ranging from 0.05% to 5% by weight of the emulsion, preferably ranging from 1% to 2% by weight" means that the total content of the two agents ranges from 0.05% to 5% by weight of the emulsion, preferably from 1% to 2% by weight of the emulsion.

The emulsion according to the invention may also comprise one or more additives, which may in particular be intended to give the final thermoplastic composition particular properties/features.

Preferably, said additive is chosen from the group consisting of antioxidants; UV protection agents; processing agents, having the function of improving the final appearance when it is used, such as fatty amides, stearic acid and salts thereof, ethylenebis(stearamide) or fluoropolymers; antifogging agents; antiblocking agents such as silica or talc; fillers, such as calcium carbonate, and nanofillers, for instance clays; coupling agents such as silanes; antistatic agents; nucleating agents; pigments; dyes; plasticizers; fluidizers and flame-retardant additives such as aluminum hydroxide or magnesium hydroxide; pH regulators such as phosphate and citrate buffers; chelating agents; biocides, for example fungicides; antiozonants, antioxidants; anti-degrading agents, swelling agents and mold-release agents.

Preferably, said additive does not have any impact on the homogeneity of the solution.

Said additive may be added in the amounts usually used and known to those skilled in the art. These additives are generally used in contents of between 10 ppm and 10 000 ppm by weight relative to the weight of the emulsion.

Preferably, the emulsion according to the present invention comprises water so as to form the rest of the composition (up to 100%). Preferably, the water is deionized water or distilled water.

The aqueous emulsions according to the invention preferably have a dynamic viscosity, at −10° C. and 100 $s^{-1}$, of less than 1000 mPa·s, preferentially less than 700 mPa·s and more preferentially less than 500 mPa·s (the viscosity measurements are measured, for example, according to the standard DIN 53019, which is well known to those skilled in the art, with a machine such as a Viscotester Haake VT550, at −10° C. and for a shear rate of 100 $s^{-1}$).

The aqueous emulsions according to the invention preferably have a flow time of less than 200 seconds, preferentially less than 100 seconds (the flow time measurements may be taken, for example, by means of a consistometric cup technique DIN 53211, viscosity cup diameter of 4 mm, temperature of 5° C.).

Process

The invention also relates to a process for preparing an aqueous emulsion of peroxyester, comprising a step a) of mixing:

at least one antifreeze as defined above, a combination of at least two emulsifiers chosen from the group consisting of 1) a non-ethoxylated sorbitan ester, 2) an ethoxylated sorbitan ester, and 3) an ethoxylated fatty alcohol, as defined above, water, at least one peroxyester as defined above.

Preferably, step a) is performed by mixing said at least one organic peroxide with an aqueous solution comprising said at least one antifreeze and said at least two emulsifiers.

Preferably, step a) is an emulsification step. Preferably, step a) is performed at a temperature of less than 5° C., preferably less than 0° C. and even more preferentially at a temperature of less than −5° C. The use of such temperatures makes it possible to limit the premature degradation of the organic peroxide.

Preferably, the aqueous emulsion is prepared with deionized water or distilled water.

Preferably, the mixing step is performed with a high-shear mixer to divide and/or homogenize the peroxide in the aqueous phase as much as possible.

Examples of mixers that may be mentioned include mechanical-rotation paddle and anchor stirrers, impeller stirrers, turbomixers, ultrasonic mixers and rotor-stator mixers.

Use of the Emulsion

The present invention also relates to the use of the emulsion as defined above for the polymerization of ethylenically unsaturated monomers.

For the purposes of the present invention, the term "polymerization" means the polymerization of the ethylenically unsaturated monomers alone or their copolymerization with comonomers.

Preferably, the polymerization is performed at an initiation temperature of between 45° C. and 70° C.

Ethylenically unsaturated monomers that may be mentioned include butadiene, acrylates, vinyl esters, vinyl halides such as vinyl chloride, vinyl ethers and aromatic vinyl compounds such as styrene and vinylidene halides such as vinylidene chloride and vinylidene fluoride. Preferably, the ethylenically unsaturated monomer is vinyl chloride.

Polymerization Process

The present invention also relates to a process for polymerizing ethylenically unsaturated monomers, comprising a step of polymerization in the presence of the emulsion as defined above.

The examples that follow serve to illustrate the invention without limiting it.

Examples

Production of the Formulations of the Test Compositions:

The emulsions were prepared according to the protocol below:

The aqueous phase containing the emulsifiers, the antifreeze and the water is stirred between 500 and 1000 rpm (revolutions per minute) and maintained at −5° C. (Celsius). The organic peroxide is added gradually to the reactor containing this water/emulsifier/antifreeze mixture. Stirring is maintained for 3 minutes at 2000 rpm. The whole is then stirred vigorously using a machine such as an Ultra-Turrax S-25N 18G blender for 2 minutes at 9500 rpm and then stirred using a paddle at 1000 rpm for 1 minute. Each emulsification is performed on 200 g in total.

The following emulsions were produced:

an antifreeze system which is a mixture of alcohols with a 60/40 mass ratio of ethanol/1,2-propanediol, in an overall concentration of 16%;

40% of one of the following organic peroxides: Luperox® 11 (tert-butyl peroxypivalate), Luperox® 610 (3-hydroxy-1,1-dimethylbutyl peroxyneodecanoate), Luperox® 10 (tert-butyl peroxyneodecanoate) and Luperox® 554 (tert-amyl peroxypivalate) from Arkema);

an emulsifier or a combination of emulsifiers;

the remainder is distilled water.

TABLE 1

| Emulsion | Organic peroxide | Emulsifier 1 | Emulsifier 2 | HLB of the emulsifier or of the combination of emulsifiers |
|---|---|---|---|---|
| 1 | Luperox ® 11 | 0.48% by weight of Tween 80 (HLB 15) | 1.12% by weight of Span 80 (HLB 4.3) | 7.5 |
| 2 | Luperox ® 11 | 0.38% by weight of Surfaline OC23L (HLB 16) | 2.16% by weight of Span 80 (HLB 4.3) | 6.0 |
| 3 | Luperox ® 11 | 0.68% by weight of Surfaline ® CS25L (HLB 16.2) | 0.54% by weight of Span 80 (HLB 4.3) | 10.9 |
| 4 | Luperox ® 11 | 0.85% by weight of Surfaline ® OC23L (HLB 16) | 0.29% by weight of Span 80 (HLB 4.3) | 13.0 |
| 5 (Comparative) | Luperox ® 11 | 1.5% by weight of Surfaline ® OC23L (HLB 16) | — | 16.0 |
| 6 (Comparative) | Luperox ® 11 | 1.6% by weight of Tween 80 (HLB 15) | | 15.0 |
| 7 | Luperox ® 610 | 0.80% by weight of Surfaline ® CS25L (HLB 16.2) | 0.85% by weight of Span 80 (HLB 4.3) | 10.1 |
| 8 | Luperox ® 10 | 0.60% by weight of Surfaline ® CS25L (HLB 16.2) | 0.85% by weight of Span 80 (HLB 4.3) | 9.2 |
| 9 | Luperox ® 554 | 0.80% by weight of Tween 80 (HLB 15) | 0.80% by weight of Span 80 (HLB 4.3) | 9.6 |

Tests Performed:

The following measurements were taken after storage at −20° C. for 6 months:

The dynamic viscosity measurements are taken using a viscometer such as a Viscotester Haake VT550 machine. The measuring device is the SV-DIN 53019, referring to the standard DIN 53019. The measurement is taken using coaxial cylinders which create the shear. Between 5 and 10 ml (milliliters) of emulsion are introduced into the measuring chamber maintained at −10° C. The values given in the examples below correspond to a shear rate of 100 $s^{-1}$ and are expressed in mPa·s.

The flow time measurements are taken using consistometric cups according to the standard DIN 53211 (viscosity cup diameter: 4 mm), which is well known to those skilled in the art. The measurement is taken on 100 g of emulsion after conditioning at +5° C. The flow time measurements are expressed in seconds.

The droplet size is determined via conventional means using the light scattering technique. The measurements are taken using a Malvern Mastersizer 2000© device at room temperature. The droplet sizes $d_{50}$ or $d_{100}$ are determined with a precision of ±0.5 μm (micrometers).

The organic peroxide concentration is measured by HPLC on a specimen withdrawn from the top of the sample and another from the bottom of the sample of the emulsion. The emulsion is considered to be stable if a difference of less than 4% between the concentrations at the top and the bottom of the sample is observed.

The results are presented in table 2 below:

TABLE 2

| Emulsion | 1 | 2 | 3 | 4 | 5 | 6 | 7 | 8 | 9 |
|---|---|---|---|---|---|---|---|---|---|
| Volume-mean droplet size (μm) | 1 | 0.7 | 1 | 1.5 | Phase separation at 2 months | Phase separation at 4 months | 1.8 | 1.5 | 1 |
| Maximum droplet size (μm) | 2.9 | 1.9 | 2.5 | 5 | | | 7.6 | 4.4 | 2.9 |
| Flow time (s) | 30 | 42 | 30 | 32 | | | 33 | 24 | 43 |
| Viscosity (mPa · s) at −20° C. and 125.5 $s^{-1}$ | 330 | 340 | 330 | 332 | | | 300 | 270 | 370 |
| Organic peroxide concentration at the top of the emulsion | 40.6% | 40.4% | 41.2% | 43.2% | | | 49.5% | 50.6% | 40.2% |
| Organic peroxide concentration at the bottom of the emulsion | 40.2% | 39.8% | 39.3% | 19.8% | | | 49% | 50.2% | 40.4% |

The invention claimed is:

1. An aqueous emulsion of organic peroxide, consisting of:

at least one peroxyester, at least one antifreeze, a combination of at least two emulsifiers selected from the group consisting of:

a non-ethoxylated sorbitan ester, an ethoxylated sorbitan ester, and an ethoxylated fatty alcohol, optionally, one or more additives in a content between 10 ppm and 10,000 ppm by weight relative to the weight of the emulsion, and water, wherein the antifreeze comprises ethanol in combination with another alcohol selected from ethylene glycol, 1,2-propanediol, 1,3-propanediol, glycerol, 1,3-butanediol, 1,4-butanediol, and mixtures thereof.

2. An aqueous emulsion of organic peroxide, comprising:

at least one peroxyester, at least one antifreeze, and a combination of at least two emulsifiers selected from the group consisting of:

a non-ethoxylated sorbitan ester, an ethoxylated sorbitan ester, and an ethoxylated fatty alcohol, wherein the combination of said at least two emulsifiers has an HLB of less than 10, wherein the emulsion does not comprise any methanol, and wherein the antifreeze comprises ethanol in combination with another alcohol selected from ethylene glycol, 1,2-propanediol, 1,3-propanediol, glycerol, 1,3-butanediol, 1,4-butanediol, and mixtures thereof.

3. The emulsion as claimed in claim 2, wherein the non-ethoxylated sorbitan ester is selected from the group consisting of sorbitan monostearate, sorbitan tristearate, sorbitan monolaurate, sorbitan trilaurate, sorbitan monooleate, sorbitan trioleate, sorbitan monopalmitate, sorbitan tripalmitate and combinations thereof.

4. The emulsion as claimed in claim 2, wherein the ethoxylated sorbitan ester is selected from the group consisting of ethoxylated sorbitan monostearate, ethoxylated sorbitan tristearate, ethoxylated sorbitan monolaurate, ethoxylated sorbitan trilaurate, ethoxylated sorbitan monooleate, ethoxylated sorbitan trioleate, ethoxylated sorbitan monopalmitate, ethoxylated sorbitan tripalmitate and combinations thereof.

5. The emulsion as claimed in claim 2, wherein said at least two emulsifiers are present in a content ranging from 0.05% to 5% by weight of the emulsion.

6. The emulsion as claimed in claim 2, wherein said at least one organic peroxide is present in a content of between 30% to 70% by weight, relative to the total weight of the composition.

7. The emulsion as claimed in claim 2, wherein said at least one peroxyester is selected from the group consisting of:

peroxyneodecanoates, peroxyneoheptanoates, peroxypivalates, peroxyethylhexanoates, tert-butyl peroxyisobutyrate, and mixtures thereof.

8. The emulsion as claimed in claim 2, wherein said at least one antifreeze is selected from the group consisting of ethanol, ethylene glycol, isopropanol, n-propanol, 1,2-propanediol, 1,3-propanediol, glycerol, 1-butanol, 2-butanol, 1,3-butanediol and 1,4-butanediol and mixtures thereof.

9. The emulsion as claimed in claim 2, wherein it comprises between 5% and 25% by weight of antifreeze, relative to the total weight of the aqueous emulsion.

10. The emulsion according to claim 2, wherein the emulsion has a dynamic viscosity of less than 1000 mPa·s at −10° C. and a shear rate of 100 $s^{-1}$.

11. The emulsion according to claim 10, wherein the emulsion has a dynamic viscosity of less than 500 mPa·s at −10° C. and a shear rate of 100 $s^{-1}$.

12. The emulsion according to claim 2, wherein the emulsion has a flow time of less than 200 seconds as measured using a consistometric cup according to DIN 53211 with a viscosity cup diameter of 4 mm at a temperature of 5° C.

13. The emulsion according to claim 12, wherein the emulsion has a flow time of less than 100 seconds.

14. The emulsion according to claim 2, wherein the emulsion has a mean droplet size (d50) of less than or equal to 5 m and a maximum droplet size (d100) of less than or equal to 20 m after storage at −20° C. for 6 months.

15. A process for polymerizing ethylenically unsaturated monomers, comprising a step of polymerization in the presence of the emulsion of claim 2.

16. The process of claim 15, wherein the ethylenically unsaturated monomer is vinyl chloride.

17. A process for preparing an aqueous emulsion of peroxyester that does not comprise any methanol, comprising a step a) of mixing:

at least one antifreeze, a combination of at least two emulsifiers selected from the group consisting of 1) a non-ethoxylated sorbitan ester, 2) an ethoxylated sorbitan ester, and 3) an ethoxylated fatty alcohol, wherein the combination of said at least two emulsifiers has an HLB of less than 10, water, and at least one peroxyester, wherein the antifreeze comprises ethanol in combination with another alcohol selected from ethylene glycol, 1,2-propanediol, 1,3-propanediol, glycerol, 1,3-butanediol, 1,4-butanediol, and mixtures thereof.

18. An aqueous emulsion of organic peroxide, comprising:

at least one peroxyester, at least one antifreeze, and a combination of emulsifiers comprising an ethoxylated fatty alcohol that is a $C_4$-$C_{30}$ fatty alcohol and at least one emulsifier selected from the group consisting of:

a non-ethoxylated sorbitan ester, and an ethoxylated sorbitan ester, wherein the combination of emulsifiers has an HLB of less than 13 and the emulsion does not comprise any methanol, wherein the antifreeze comprises ethanol in combination with another alcohol selected from ethylene glycol, 1,2-propanediol, 1,3-propanediol, glycerol, 1,3-butanediol, 1,4-butanediol, and mixtures thereof.

19. The emulsion of claim 18, wherein the ethoxylated fatty alcohol is $C_4$-$C_{20}$.

20. The emulsion of claim 18, wherein the ethoxylated fatty alcohol is $C_{16}$-$C_{18}$ linear or branched, cyclic or noncyclic, saturated or unsaturated, aromatic or nonaromatic fatty alcohol and contains between 3 and 80 alkylene oxide units.

* * * * *